Figure 1:
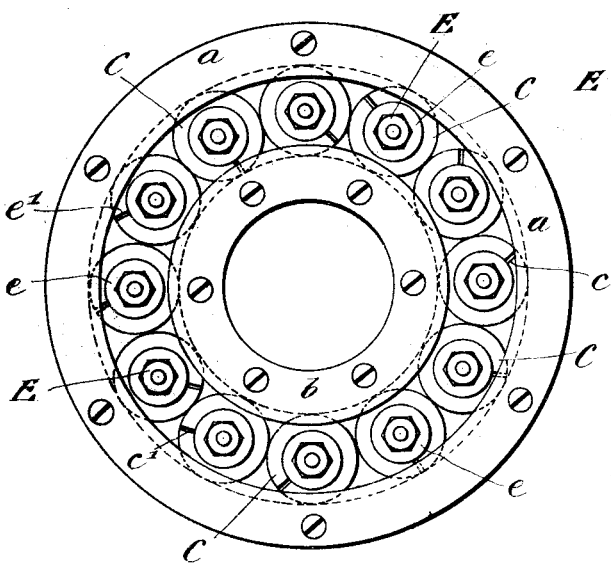

H. HESS.
ANTIFRICTION BEARING AND ROLLER.
APPLICATION FILED MAR. 24, 1911.

1,182,011.

Patented May 9, 1916.

UNITED STATES PATENT OFFICE.

HENRY HESS, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

ANTIFRICTION BEARING AND ROLLER.

1,182,011.   Specification of Letters Patent.   Patented May 9, 1916.

Application filed March 24, 1911. Serial No. 616,737.

*To all whom it may concern:*

Be it known that I, HENRY HESS, a citizen of the United States, residing at Philadelphia, in the county of Philadelphia and State of Pennsylvania, have invented certain new and useful Improvements in Antifriction Bearings and Rollers, of which the following is a specification, reference being had therein to the accompanying drawing.

My invention relates to anti-friction bearings and rollers therefor, and more particularly to certain novel features in a roller, and to a bearing adapted to coöperate therewith.

The invention has for an object to provide an improved roller bearing and one which is capable of a greater length of use and greater durability than any heretofore known bearings; and more particularly an object is to provide an efficient and reliable means for expanding a worn bearing roller so that the same may be restored to its original dimensions and thus continued indefinitely in use.

The invention consists in the novel roller structure and bearing adapted to employ the same, of which an instance is shown in the drawings hereof and which is set forth in the claims.

Figure 2:
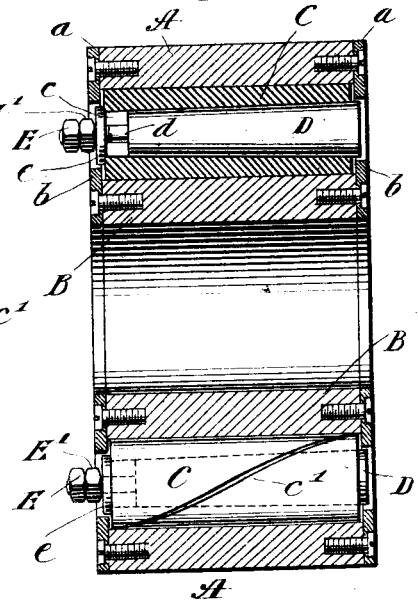
Figure 3:
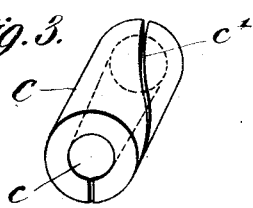
Figure 4:
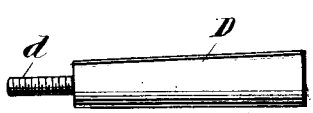
Figure 5:
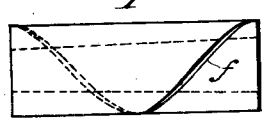
Figure 6:
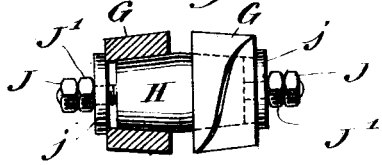

In the accompanying drawings, Figure 1 is a face view of a roller bearing containing rollers and illustrating one embodiment or instance of my invention. Fig. 2 is a central cross-section of the bearing shown in Fig. 1. Fig. 3 is a perspective view of the hollow shell member of the roller. Fig. 4 is a side view of the expander. Fig. 5 is a side view of a modified shell; and Fig. 6 shows a different embodiment in which the roller form is that of a double cone instead of a cylinder as in the other figures.

Similar letters of reference are employed to designate corresponding parts in the several figures.

My invention has no particular reference to any one type of roller bearing but is applicable to all types such as thrust bearings, radial bearings with cylindrical rollers, and various forms of bearings with conical rollers. All such types of bearings have in common that there are opposed bearing surfaces between which roll an appropriate number of rollers. A radial bearing is illustrated in Figs. 1 and 2, in which the opposed bearing surfaces comprise the outer track A, the inner track B, the outer annular retainers $a$, $a$, and the opposed inner annular retainers $b$, $b$, secured respectively to the rings A and B, and means for attaching the respective rings to the shafts, wheels or other devices in connection with which the bearing is to be employed. Twelve rollers are shown which might be, but are not, indicated as being separated one from the other, and each roller constructed in accordance with my invention is adapted to be expanded in its diameter and has means for expanding it. The following may be the detail construction of such a roller: A shell C forms the part which actually contacts the bearing surfaces of the rings A and B, and this shell according to my invention is rendered hollow by having a longitudinal bore as seen at $c$. Besides being bored from end to end longitudinally, the shell is also slitted entirely through its metal and completely from one end to the other. This slit is indicated at $c'$ wherefrom it appears to be curved, being in the form, for example, of a helix, thus avoiding the objections which would result if the slit were upon a straight line constituting an element of the cylindrical shell. Stated another way the slit $c'$ is cut or otherwise formed not in a plane passing through the roller's axis, but in such a way that the successive slit lengths are located in different planes or on different elements of the cylinder.

The bore within the shell and the expander before referred to, coöperate with each other in the expansion or adjustment of the roller, and I prefer to effect this by constituting the bore of a tapered or conical form, as clearly indicated, whereby the longitudinal adjustment of the expander will serve to enlarge the bore and thereby enlarge the shell so as to increase the roller's diameter. I prefer also to construct the expander of a conical form as seen at D, and in this way all parts of the inclosed expander contact and afford a solid backing for the shell so that the latter in being expanded will enlarge uniformly, thus avoiding any distortion or any departure from the true cylindrical form of the roller. It will be understood, especially from Fig. 2, that the expander D is intended to be moved lengthwise toward the smaller end, and this movement or adjustment of the expander and the locking of it in place may be provided for by a threaded extension *d* at the small end of the expander and a couple of locking nuts E, E' or equivalent devices, and in connection with such locking nuts may be employed a washer *e* located between the nuts and giving them a more efficient bearing against the end of the roller shell.

When a bearing becomes worn by reason of the wear either of the rollers or of the rings or both, there will be a certain amount of play or lost motion, and that will be taken up according to my invention by adjustably expanding or enlarging all of the rollers by substantially equal amounts. Each roller with or without being removed from the bearing will first have its nut E' tightened by a wrench or otherwise, during which operation care may be taken to treat all of the rollers alike by tightening the nuts and causing their expansion by small increments until the bearing is restored to proper condition. Thereupon the locking nut E will be tightened upon the nut E', thus permanently fixing the parts in the desired position.

In the bearing shown the entire roller length is subject to wear, and it may wear uniformly from end to end. But if it should wear irregularly or require machining, or if it were preferred to adjust each roller to a standard before resuming the use of the bearing, the roller would preferably be taken out, treated as desired, carefully expanded to the proper adjustment by the nut E', locked in that position by the nut E and replaced in the bearing.

Roller bearings are provided with retaining means for preventing the dropping out of the rollers, and with my invention this may consist of the retainers *a*, *b*, at each end. Between the retainers *a*, *b* will be seen to exist an annular space or opening which is allowed of sufficient size for accommodating the locking and adjusting nuts E, E', and incidentally the projecting large end of the conical expander D, which initially will be made of extra length so as to permit its being taken up during expansion without depriving the hollow slitted shell at that end of the full benefit of its support and rigidity.

The curvedly slitted roller F shown in Fig. 5 is a modified form, the slit *f* in this case being cut along a different curve, namely a helix having a pitch half of that of the slit *c'* of Figs. 2 and 3.

The same principles as above set forth are applicable to bearings containing single or double conical rollers, an instance of the latter being shown in Fig. 6 wherein two separate expansible shells G, G will preferably be employed and a double ended expander H within them, each of the shells having as before some adjusting and locking means such as nuts J, J' and washers *j* intermediate the latter and the shell ends.

It will be seen that by reason of the structure or roller and bearing above shown and described, the objects and advantages are afforded which have been previously set forth, and other advantages will be apparent to those skilled in the art. It is to be understood that the invention in its broader aspects is not limited to the precise construction shown nor to any particular construction by which the invention has been or may be carried into effect, since many changes may be made in the details of the parts without departing from the main principles of the invention and without sacrificing its chief advantages; and no limitations are intended except such as are set forth in the respective claims.

What I claim and desire to secure by Letters Patent is:

1. An antifriction bearing including in combination, a pair of relatively revoluble bearing tracks, a plurality of hollow metal rollers engaging said tracks, each roller having a curved slit extending from end to end and through the hollow shell thereof, means for taking up wear between said tracks and rollers, comprising a plurality of independent adjusting devices, one for each of said rollers, and arranged to permit the independent enlargement of each roller by spreading the curved slit therein while preserving the substantial continuity of the rolling surface of each roller.

2. An antifriction bearing including in combination, a pair of relatively revoluble bearing tracks, a plurality of hollow metal rollers engaging said tracks, each roller having a curved slit extending from end to end and through the hollow shell thereof, means for taking up wear between said tracks and rollers, comprising a plurality of independent adjusting devices, one for each of said rollers, and arranged to permit the independent enlargement of each roller by spreading the curved slit therein while preserving the substantial continuity of the rolling surface of each roller, each of said devices consisting of an interior shell-expander, and an exterior adjuster therefor located at the axial end of the roller, and said tracks constructed with space to accommodate the several adjusters as the rollers travel.

In testimony whereof I affix my signature in presence of two witnesses.

HENRY HESS.

Witnesses:
Theo. H. M'Calla,
Nettie L. Hahn.

Copies of this patent may be obtained for five cents each, by addressing the "Commissioner of Patents, Washington, D. C."